(12) United States Patent
Wiechers et al.

(10) Patent No.: US 6,619,316 B2
(45) Date of Patent: Sep. 16, 2003

(54) CHECK VALVE HAVING ADJUSTABLE LIFT, PACKING ASSEMBLY, AND RETROFIT KIT FOR SAME

(75) Inventors: Jonathan T. Wiechers, Defiance, OH (US); Kerry G. Vonalt, Edgerton, OH (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 26 days.

(21) Appl. No.: 10/027,680

(22) Filed: Dec. 20, 2001

(65) Prior Publication Data

US 2003/0116198 A1 Jun. 26, 2003

(51) Int. Cl.$^7$ ................................................ F16K 15/04
(52) U.S. Cl. .................... 137/533.11; 137/533; 137/528
(58) Field of Search ................................. 137/528, 532, 137/533, 533.11, 533.13, 533.15, 269, 270

(56) References Cited

U.S. PATENT DOCUMENTS

| | | | | |
|---|---|---|---|---|
| 487,298 A | * | 12/1892 | Sinclair | 137/533 |
| 1,642,724 A | * | 9/1927 | Fleming | 137/533.13 |
| 2,536,836 A | * | 1/1951 | Bowling | 137/533.11 |
| 2,590,244 A | * | 3/1952 | Harbison | 137/533.11 |
| 2,591,174 A | * | 4/1952 | Martin | 137/533.13 |
| 2,899,974 A | * | 8/1959 | Gratzmuller | 137/533.11 |
| 4,070,237 A | * | 1/1978 | Woodward | 137/533.13 |
| 4,683,910 A | * | 8/1987 | Benson et al. | 137/533 |
| 4,722,672 A | | 2/1988 | Rinneer | 417/310 |
| 4,775,303 A | | 10/1988 | Liska | 417/554 |
| 5,593,292 A | | 1/1997 | Ivey | |
| 5,647,737 A | | 7/1997 | Gardner et al. | 417/454 |
| 5,678,603 A | | 10/1997 | Tschop | 137/512.1 |
| 5,813,483 A | | 9/1998 | Latham et al. | 175/218 |
| 6,105,610 A | | 8/2000 | Watkins, II et al. | 137/516.29 |
| 6,123,102 A | | 9/2000 | Loegel, Sr. | 137/529 |

FOREIGN PATENT DOCUMENTS

WO    WO 03/001095 A1    1/2003

OTHER PUBLICATIONS

Graco Catalog, XTREME™ High Performance Airless Spray Packages, © 2001 Graco Inc. Form No. 300578A 5/01, Graco, Inc., Minneapolis, MN, 8 Pages.
Graco Brochure 302441, XTREME™ Pump Service Demonstration, ©2001, 2 Pages.
Internet webpage for XTREME™ Pump Lower Features Copyright © 1999–2001 Graco Inc.
Graco Catalog 309340,Rev. C, Instructions–Parts List,Graco,Inc., Minneapolis, MN, ©Copyright 2001, Graco Inc., 46 Pages.
New XTREME, Graco Xtreme Pump Article, Undated, 1 Page.
Operator's Manual, 66475–X, Two–Ball Style Lower Pump End, Revised: Jan. 14, 2000 (Rev. D), ARO Ingersoll–Rand Fluid Products Division, Bryan, Ohio, 4 Pages.
European Search Report dated May 22, 2003 for European Patent Application No. 02258420.5–1252 (3 pages).

* cited by examiner

*Primary Examiner*—John Rivell
(74) *Attorney, Agent, or Firm*—Michael Best & Friedrich LLP

(57) ABSTRACT

A packing assembly, retrofit kit, and check valve with adjustable lift having a ball stop member having opposed first and second contact portions and at least two washers being provided in a stacking configuration. The stacking configuration is one selected from one in which all of the at least two washers are stacked against the first contact portion of the ball stop member, one in which all of the at least two washers are stacked against the second contact portion of the ball stop member, and one in which at least one of the at least two washers is stacked against the first contact portion of the ball stop member and at least one of the at least two washers is stacked against the second contact portion of the ball stop member. Preferably, the at least two washers are of different thicknesses with, more preferably, the thicknesses of the at least two washers being multiples of each other. Most preferably, the at least two washers are a first washer and a second washer with the second washer having a thickness that is twice the thickness of the first washer.

20 Claims, 4 Drawing Sheets

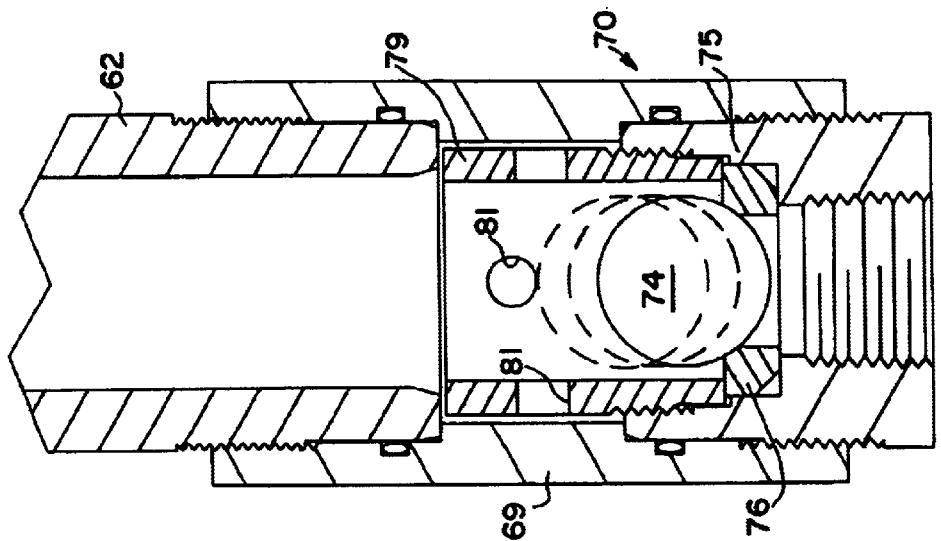
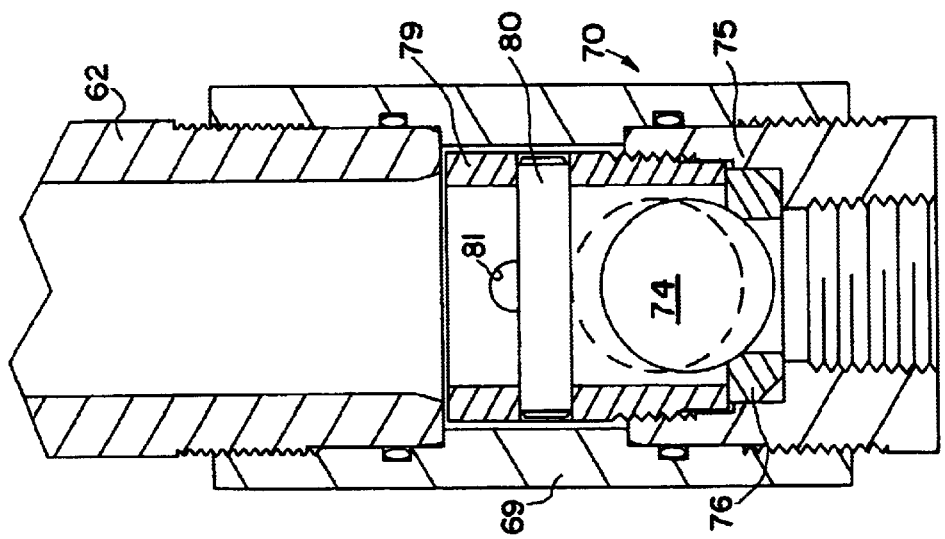

CHECK VALVE HAVING ADJUSTABLE LIFT, PACKING ASSEMBLY, AND RETROFIT KIT FOR SAME

FIELD OF THE INVENTION

This invention relates generally to fluid valves and more particularly to fluid valves having adjustable lifts for pumps.

DESCRIPTION OF THE PRIOR ART

In hydraulic pumping systems, check valves are typically used to limit-the direction of flow through a pump. As is known in the art, these valves include a ball closure element which, responsive to the direction of fluid movement through the valve, closes to prevent the passage of the fluid in one direction by moving into engagement with a valve seat and opens to permit the passage of the fluid in an opposite direction by moving away from the valve seat. In order to control the amount of fluid pressure that is permitted to flow through a valve, a ball stop element is generally used to limit the distance, commonly referred to as "lift," to which the ball closure element is permitted to move away from the valve seat.

An exemplary pump having check valves with ball stops that limit the lift of a ball closure element is shown in commonly assigned U.S. Pat. No. 5,647,737, the disclosure of which is incorporated herein by reference. A two-ball style pump available from Ingersoll-Rand Company, Woodcliff Lake, N.J. as the ARO Model 66475 pump incorporates such check valves having a ball closure element located within a cylindrical ball guide in its lower pump end to control the inlet flow of a fluid to be pumped into the pump. A pin positioned in holes located in a ball guide is used as a ball stop element to increase or decrease the lift of the ball valve element in the valve body. If more ball lift is desired for heavier (i.e., more viscous) fluids, the pin is moved to holes in the ball guide that are further away from the valve seat. Conversely, if less ball lift is desired for lighter (i.e., less viscous) materials, the pin is moved to holes located closer to the valve seat in the ball guide.

Manufacturing such check valves with adjustable lifts, however, require drilling or otherwise providing multiple sets of holes in the cylindrical ball guide for providing multiple positions into which a ball stop pin could be inserted.

The foregoing illustrates limitations known to exist in present devices and methods. Thus it is apparent that it would be advantageous to provide an alternative directed to overcoming one or more of the limitations set forth above. Accordingly an alternative packing assembly, retrofit kit, and check valve having an adjustable lift are provided that include the features more fully disclosed hereinafter.

SUMMARY OF THE INVENTION

According to the present invention, a packing assembly, retrofit kit, and check valve with adjustable lift are provided having a ball stop member having opposed first and second contact portions and at least two washers being provided in a stacking configuration. The stacking configuration is one selected from one in which all of the at least two washers are stacked against the first contact portion of the ball stop member, one in which all of the at least two washers are stacked against the second contact portion of the ball stop member, and one in which at least one of the at least two washers is stacked against the first contact portion of the ball stop member and at least one of the at least two washers is stacked against the second contact portion of the ball stop member. Preferably, the at least two washers are of different thicknesses with, more preferably, the thicknesses of the at least two washers being multiples of each other. Most preferably, the at least two washers are a first washer and a second washer with the second washer having a thickness that is twice the thickness of the first washer.

The foregoing and other aspects will become apparent from the following detailed description of the invention when considered in conjunction with accompanying drawing figures.

BRIEF DESCRIPTION OF THE DRAWING FIGURES

FIG. 1 is a cross-sectional view of a reciprocating pump having a conventional check valve with a ball stop pin having adjustable lift positions;

FIG. 2 is a cross-sectional view of the reciprocating pump shown in FIG. 2 having a conventional check valve with the ball stop pin removed;

DETAILED DESCRIPTION OF THE PREFERRED EMBODIMENTS

Figure 4:
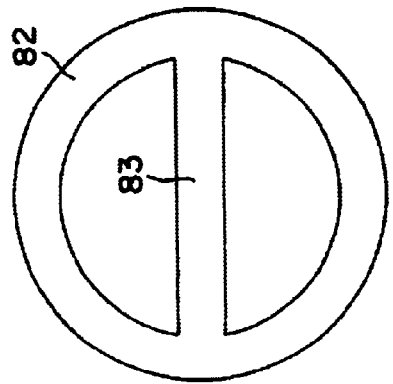
FIG. 4 is a planar view of a ball stop washer according to the present invention.

The invention is best understood by reference to the accompanying drawings in which like reference numbers refer to like parts. It is emphasized that, according to common practice, the various dimensions of the diaphragms and the associated component parts as shown in the drawings are not to scale and have been enlarged for clarity.

Referring now to the drawings, shown in FIGS. 1 and 2 is a conventional foot valve 70 attached to an elongate pump tube 62 of a reciprocating pump (not shown) well known to one skilled in the relevant art. Foot valve 70 includes a check valve having a check ball 74 seated in check valve seat 76 which is held by a foot valve body 75 into which fluid to be pumped enters at the bottom. Attached to foot valve body 75 is a ball guide 79 in which check ball 74 moves into and out of sealing engagement with check valve seat 76. Foot valve body 70 is threadingly attached to pump tube 62 by a threaded sleeve 69. As shown in FIG. 1, a ball stop pin 80 is passed through circular openings 81 formed in ball guide 79. As shown in greater detail in FIG. 2 in which the ball stop pin 80 has been removed, multiple pairs of cylindrical openings 81 are provided for positioning the ball stop pin 80. By moving ball stop pin 80 to cylindrical holes 81 closer or further away from check valve seat 76, the length of travel of the check valve ball 74 shown by the phantom ball positions in FIG. 2 can be respectively decreased or increased to selectively adjust the ball lift height.

Figure 3:
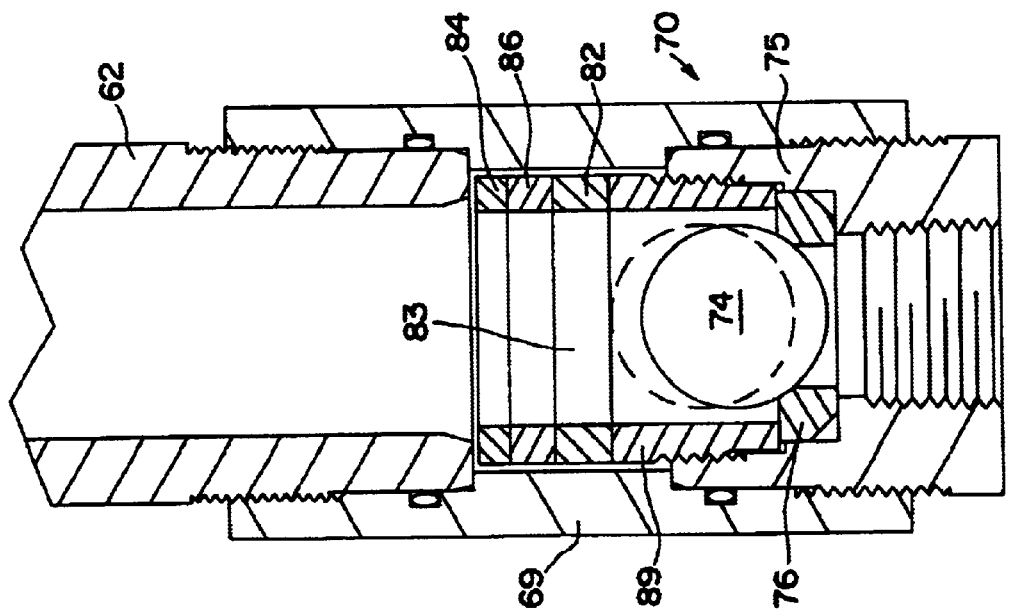
FIG. 3 is a cross-sectional view of a reciprocating pump having a check valve with adjustable lift positions according to one embodiment of the present invention.
Figure 8:
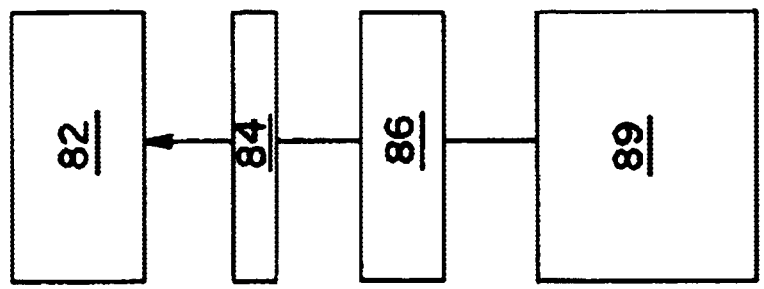
FIGS. 5–8 are exploded elevational views illustrating different stacking arrangements of washers according to one embodiment of the present invention.
Figure 5:
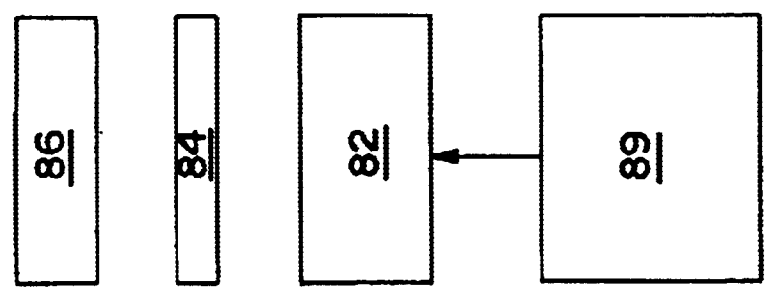
Figure 9:
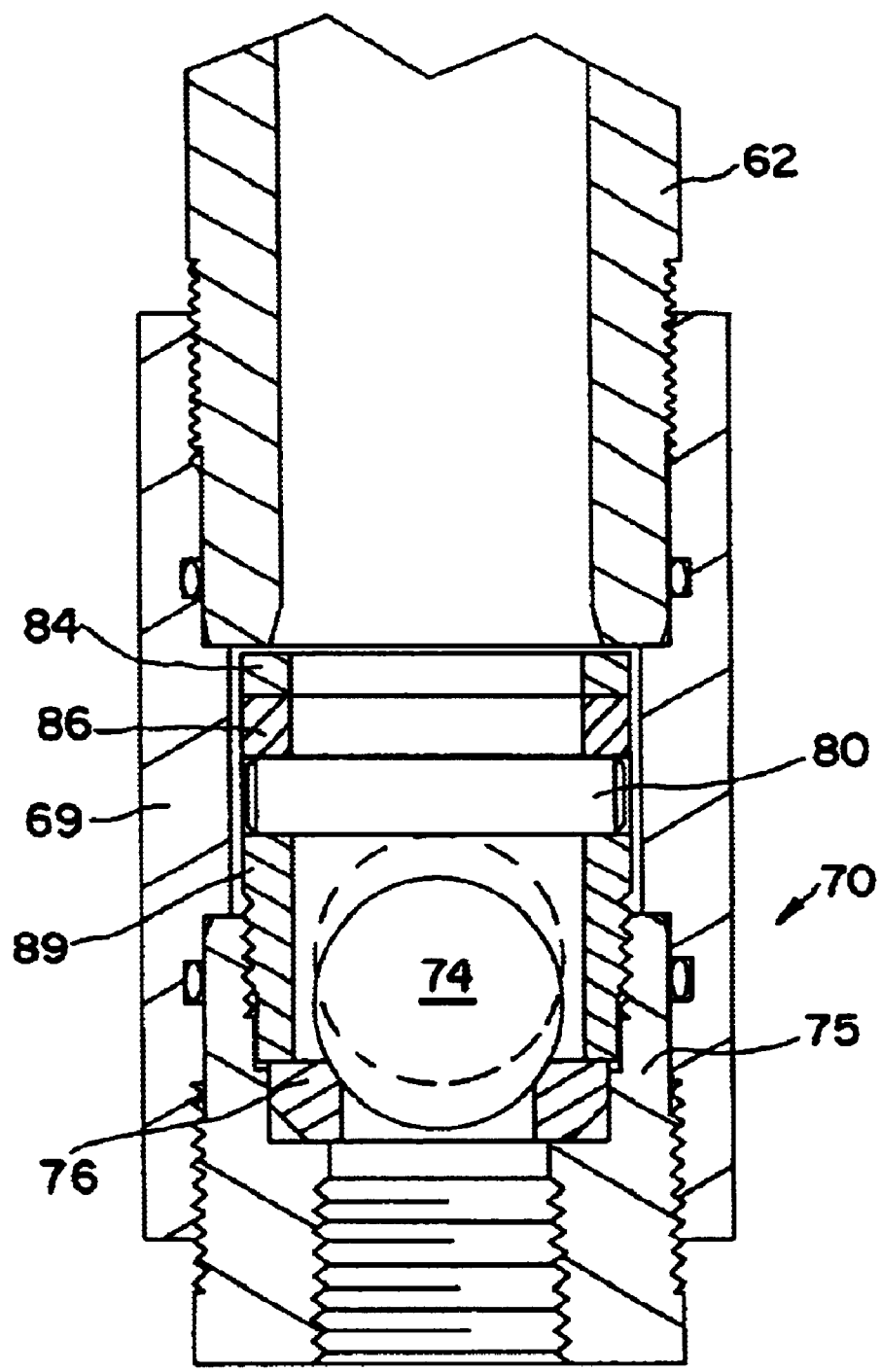
FIG. 9 is a cross-sectional view of a reciprocating pump having a check valve with adjustable lift positions according to another embodiment of the present invention.

Shown in FIG. 3 is the foot valve 70 of FIGS. 1 and 2 that has been modified to include a check valve having adjustable lift according to one embodiment of the present invention. The check valve includes a ball stop washer 82 having a cross-member 83 that preferably passes diametrically through the washer opening as shown in FIG. 4. As shown in FIG. 3 a cylindrical ball guide 89 is used in conjunction with a packing assembly having at least two washers 84 and 86 to space ball stop washer 82 from check valve seat 76. As shown in the exploded view of FIGS. 5–8, by varying the stacking arrangement of washers 84, 86 and ball stop washer 82, the ball lift of check ball 74 may be varied. By stacking washers 84, 86 against a first (i.e., underside) contact portion of ball stop washer 82 so that washers 84, 86 are between ball guide 89 and ball stop washer 82 as shown in FIG. 8, the ball lift may be maximized. By stacking stacking washers 84, 86 against a second (i.e., topside) contact portion of ball stop washer 82 so that ball stop washer 82 is located between ball guide 89 and washers 84, 86 as shown in FIG. 5, the ball lift may be minimized.

Figure 7:
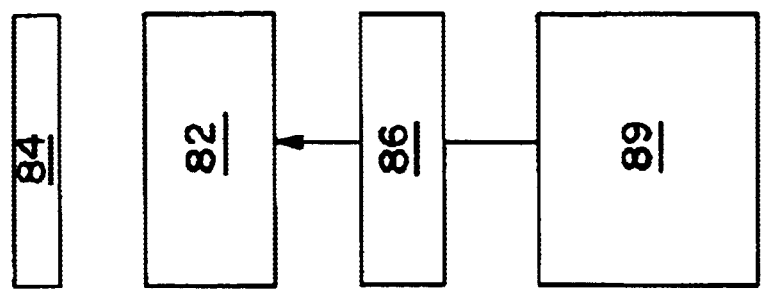
Figure 6:
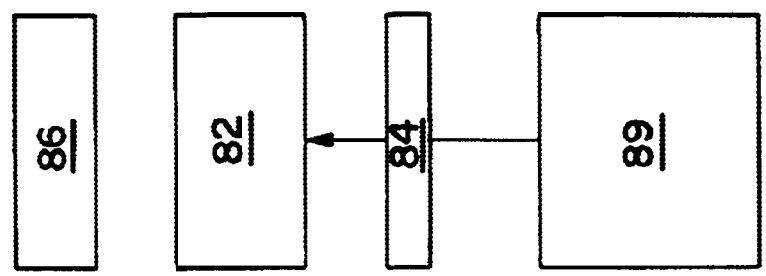

By disposing washers 84 and 86 on either side of ball stop washer 82, intermediate ball lift positions may be achieved. Preferably, washer 84 and washer 86 are of different thicknesses to provide different intermediate lift heights when used on alternate sides of ball stop washer 82 as shown in FIGS. 6 and 7. It is preferred that the thicknesses of the washers be multiples of one another to accomplish variable lifts using fewer washers than if uniform thickness washers are used. In a preferred embodiment, washer 86 is provided with a thickness that is twice the thickness of washer 84 thereby achieving the four graduated ball lift configurations shown in FIGS. 5–8 while using one less washer than would be needed if washers of uniform thickness were used.

As described above, washers 84 and 86 may be provided in check valves with ball stop washer 82 and ball guide 89 as either original equipment or as part of a retrofit to an existing check valve assembly. The retrofit is easily accomplished by replacing the ball guide 79 and ball stop pin 80 with ball guide 89 and ball stop washer 82, respectively, and configuring the packing arrangement using washers 84 and 86 to adjust the ball lift height as described in detail above. Although washers 84 and 86 are shown and described above being used in conjunction with a ball stop washer 82, a ball stop pin 80 may alternately be employed in either an original or retrofit configuration with ball guide 89 as shown in FIG.

Thus, the packing assembly according to the present invention permits the manufacture of a check valve having an adjustable ball lift without drilling or otherwise providing multiple sets of holes for ball stop pin positions. Additionally, the check valve may be easily interchanged between various ball lift heights using washers to adjust the height. Moreover, in an additional embodiment, by incorporating washers of non-uniform thicknesses, multiple ball lift heights may be achieved while using fewer washers than if uniform thickness washers are used.

While embodiments and applications of this invention have been shown and described, it will be apparent to those skilled in the art that many more modifications are possible without departing from the inventive concepts herein described. For example, although the check valve having adjustable lift is shown and described as being used in the context of the foot valve of a reciprocating pump, it is envisioned that this valve may be used in other applications where it is desirable to selectively control the ball lift height of a check valve. It is understood, therefore, that the invention is capable of modification and therefore is not to be limited to the precise details set forth. Rather, various modifications may be made in the details within the scope and range of equivalents of the claims without departing from the spirit of the invention.

Having described the invention, what is claimed is:

1. A packing assembly for a check valve, comprising:
   a ball stop member having opposed first and second contact portions; and
   at least two washers being provided in a stacking configuration selected from
      one in which all of the at least two washers are stacked against the first contact portion of the ball stop member;
      one in which all of the at least two washers are stacked against the second contact portion of the ball stop member; and
      one in which at least one of the at least two washers is stacked against the first contact portion of the ball stop member and at least one of the at least two washers is stacked against the second contact portion of the ball stop member.

2. The packing assembly according to claim 1, wherein the at least two washers are of different thicknesses.

3. The packing assembly according to claim 2, wherein the thicknesses of the at least two washers are multiples of each other.

4. The packing assembly according to claim 3, wherein the at least two washers are comprised of a first washer and a second washer, the second washer having a thickness that is twice the thickness of the second washer.

5. The packing assembly according to claim 1, wherein the ball stop member is selected from the group consisting of a ball stop pin and a ball stop washer.

6. The packing assembly according to claim 2, wherein the ball stop member is selected from the group consisting of a ball stop pin and a ball stop washer.

7. The packing assembly according to claim 3, wherein the ball stop member is selected from the group consisting of a ball stop pin and a ball stop washer.

8. The packing assembly according to claim 4, wherein the ball stop member is selected from the group consisting of a ball stop pin and a ball stop washer.

9. A check valve assembly for a pump, comprising:
   a check ball;
   a ball stop member having opposed first and second contact portions; and
   at least two washers being provided in a stacking configuration selected from
      one in which all of the at least two washers are stacked against the first contact portion of the ball stop member;
      one in which all of the at least two washers are stacked against the second contact portion of the ball stop member; and
      one in which at least one of the at least two washers is stacked against the first contact portion of the ball stop member and at least one of the at least two washers is stacked against the second contact portion of the ball stop member.

10. The check valve assembly according to claim 9, wherein the at least two washers are of different thicknesses.

11. The check valve assembly according to claim 10, wherein the thicknesses of the at least two washers are multiples of each other.

12. The check valve assembly according to claim 11, wherein the at least two washers are comprised of a first washer and a second washer, the second washer having a thickness that is twice the thickness of the second washer.

13. The check valve assembly according to claim 9, wherein the ball stop member is selected from the group consisting of a ball stop pin and a ball stop washer.

14. The check valve assembly according to claim 10, wherein the ball stop member is selected from the group consisting of a ball stop pin and a ball stop washer.

15. The check valve assembly according to claim 11, wherein the ball stop member is selected from the group consisting of a ball stop pin and a ball stop washer.

16. The check valve assembly according to claim 12, wherein the ball stop member is selected from the group consisting of a ball stop pin and a ball stop washer.

17. A packing assembly retrofit kit for a for a check valve, comprising:
   a ball stop member having opposed first and second contact portions, and
   at least two washers being provided in a stacking configuration selected from
      one in which all of the at least two washers are stacked against the first contact portion of the ball stop member;
      one in which all of the at least two washers are stacked against the second contact portion of the ball stop member; and
      one in which at least one of the at least two washers is stacked against the first contact portion of the ball stop member and at least one of the at least two washers is stacked against the second contact portion of the ball stop member.

18. The retrofit kit according to claim 17, wherein the at least two washers are of different thicknesses.

19. The retrofit kit according to claim 18, wherein the thicknesses of the at least two washers are multiples of each other.

20. The retrofit kit according to claim 19, wherein the at least two washers are comprised of a first washer and a second washer, the second washer having a thickness that is twice the thickness of the second washer.

* * * * *

UNITED STATES PATENT AND TRADEMARK OFFICE
CERTIFICATE OF CORRECTION

PATENT NO. : 6,619,316 B2
DATED : September 16, 2003
INVENTOR(S) : Jonathan T. Wiechers and Kerry G. Vonalt It is certified that error appears in the above-identified patent and that said Letters Patent is hereby corrected as shown below:

Column 1,
Line 13, change "limit-the" to -- limit the --.

Column 3,
Line 41, after "FIG." insert -- 9 -- therefor.

Signed and Sealed this

Sixteenth Day of December, 2003

JAMES E. ROGAN
*Director of the United States Patent and Trademark Office*